United States Patent [19]

Combes

[11] 4,412,555

[45] Nov. 1, 1983

[54] OVER PRESSURE RELEASE VALVE FOR A HYDRAULIC INSTALLATION

[75] Inventor: Gilles Combes, Grenoble, France

[73] Assignee: Societe Anonyme dite: Alsthom-Atlantique, Paris, France

[21] Appl. No.: 383,309

[22] Filed: May 28, 1982

Related U.S. Application Data

[63] Continuation of Ser. No. 194,479, Oct. 6, 1980, abandoned.

[30] Foreign Application Priority Data

Oct. 12, 1979 [FR] France .............................. 79 25427

[51] Int. Cl.³ ............................................ F16K 15/00
[52] U.S. Cl. .................................. 137/524; 137/494; 137/528
[58] Field of Search .............. 137/494, 524, 528, 529, 137/543.19

[56] References Cited

U.S. PATENT DOCUMENTS

| | | | |
|---|---|---|---|
| 886,045 | 4/1908 | Erlich | 137/543.19 |
| 1,631,263 | 6/1927 | Greenhouse | 137/528 |
| 2,243,711 | 5/1941 | Lamb | |
| 3,636,969 | 1/1979 | Jacbellis | 137/528 X |
| 3,913,613 | 10/1975 | Kostjunin | 137/529 X |
| 3,913,615 | 10/1975 | Cooper | 137/543.19 |
| 3,933,172 | 1/1976 | Allen | 137/494 |
| 4,245,668 | 1/1981 | Lindstrom | 137/528 |

FOREIGN PATENT DOCUMENTS

| | | | |
|---|---|---|---|
| 460840 | 6/1928 | Fed. Rep. of Germany | 137/543.19 |
| 920771 | 7/1949 | Fed. Rep. of Germany | 137/529 |
| 1083096 | 6/1960 | Fed. Rep. of Germany | |
| 1550443 | 7/1969 | Fed. Rep. of Germany | 137/528 |
| 1600818 | 4/1970 | Fed. Rep. of Germany | 137/528 |
| 2103066 | 8/1972 | Fed. Rep. of Germany | 137/528 |
| 1505971 | 12/1967 | France | |
| 2422889 | 11/1979 | France | |
| 195483 | 3/1937 | Switzerland | 137/543.19 |
| 429215 | 10/1974 | U.S.S.R. | 137/529 |

Primary Examiner—Robert G. Nilson
Attorney, Agent, or Firm—Kenyon & Kenyon

[57] ABSTRACT

The valve includes a disk (8) one side of which is subjected to the action of an adjustable thrust unit and the other side of which is applied against a seat (3) connected to the pressure source of said hydraulic installation, the thrust unit (12) being constituted by an adjustably pressurized deformable chamber. The valve is used in particular for protecting hydraulic installations e.g. water pipes against accidental overpressures, e.g. water-hammer.

3 Claims, 3 Drawing Figures

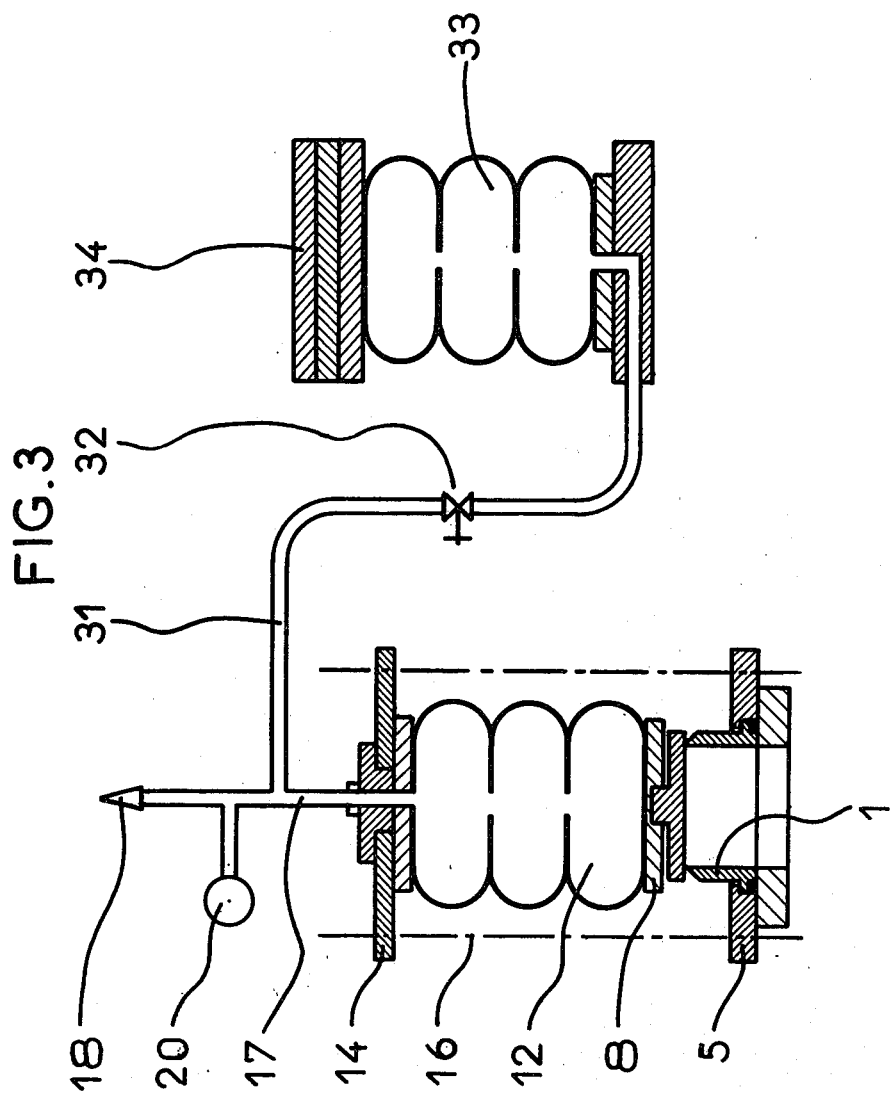

OVER PRESSURE RELEASE VALVE FOR A HYDRAULIC INSTALLATION

This is a continuation of application Ser. No. 194,479 filed Oct. 6, 1980 and now abandoned.

The invention relates to an over-pressure release valve for a hydraulic installation e.g. water pipes, to protect the installation against ramming, e.g. waterhammer.

BACKGROUND OF THE INVENTION

Such a valve, which includes a closing unit applied against a seat by a compression spring is described in particular in French Pat. No. 1 021 221.

However, to adjust the valve to match local working conditions, the valve must include a setting device for the compression spring. Now, adjusting such a device is a particularly long and tricky process. Indeed, firstly, valve protection hoods must be removed for access to the adjustment device and secondly, after the spring has been set, the elimination of the tangential component of the force due to the spring entails suitable adjustment of its antagonistic bearing collar disposed at the end distant from the closing unit.

Other known valves, e.g. U.S. Pat. No. 2,243,711 (Lamb), include hydraulic control by piston jacks. Friction of the seals of such pistons against the walls of the cylinders is liable to impair mechanical blocking and sealing.

The invention aims to provide a particularly simple over-pressure release valve for which adjustment requires no dismantling and which operates without said friction.

SUMMARY OF THE INVENTION

The invention provides an over-pressure release valve for a hydraulic installation, said valve including:

a disk which cooperates with a circular seat, the disk surface which presses against the seat being subject to the pressure of the liquid in the hydraulic installation; and a thrust member to thrust the disk against the seat;

wherein the thrust member is constituted by a substantially cylindrical flexible chamber whose length increases with increasing gas pressure therein, the diameter of the disk being at least equal to 1.20 times and preferably equal to 1.25 times that of the opening in the seat.

Such a disk is subject both to hydraulic forces tending to return it to its position parallel to the seat each time the reaction thrust of the disk acts on the face opposing the jet; and to reaction forces due to the flexible chamber.

By its very nature, the flexible chamber has a tendency to occupy a maximum volume for a minimum surface area, whereby it also tends to keep the disk parallel to the plane of the seat.

Thus the combination of disk and flexible chamber ensures that the closure member is stable on its jet, thereby making it possible to omit mechanical guide components which are always liable to friction and jamming.

The flexible chamber preferably includes a valve for connection to a source of compressed air or other compressed gas with a point for connection to a gas pressure meter for monitoring purposes.

In a preferred embodiment, the flexible chamber communicates with a bladder placed in a tank maintained at the pressure prevailing in the hydraulic installation by means of an adjustable diaphragm.

In another embodiment, the flexible chamber communicates with another flexible chamber which is subject to a setting weight.

BRIEF DESCRIPTION OF THE DRAWINGS

FIG. 3 schematically shows another variant valve in accordance with the invention.

DETAILED DESCRIPTION

Figure 1:
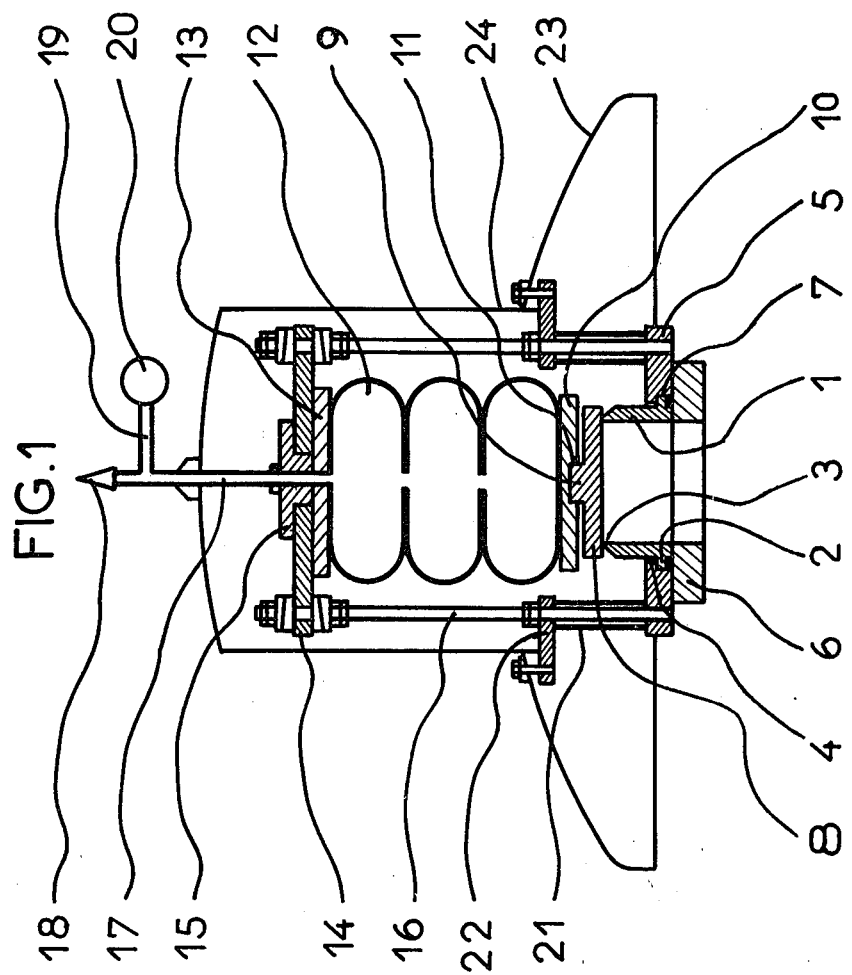
FIG. 1 schematically illustrates an axial cross section of an embodiment of the valve in accordance with the invention.

The valve illustrated in FIG. 1 is intended for protecting a system of water pipes subject to waterhammer. Systems using other liquids could also be protected by similar valves.

The valve includes a nozzle 1 whose lower end includes a shoulder 2 and whose upper end includes a seat 3. The nozzle 1 is fixed through circular opening 4 in a base plate 5 by means of a flange 6 and bolts (not shown). For this purpose, the shoulder 2 is received in a circular groove 7 formed in the lower face of the base plate 5.

The seat 3 cooperates with the lower surface of a disk 8 which constitutes the closing unit of the valve. The disk 8 is topped by a central boss 9 disposed in a bore 11 of the bottom plate 10 of a thrust member in the form of a flexible chamber 12 which includes a top plate 13 fixed by bolts (not shown) through an upper disk 14 by means of a stop 15.

The upper disk 14 is itself adjustably fixed to the base plate 5 by peripheral tie rods 16 screwed to the base plate 5 and to the upper disk 14. The upper portion of the flexible chamber includes an axial pipe 17 which passes through the top plate 13 and the stop 15 and whose upper end is provided with a valve 18 together with a branch pipe 19 leading to a pressure gauge 20.

Small columns 21 which rest on the base plate 5 and through which the tie rods 16 pass bear on a ring 22 to which a lower skirt 23 and a hood 24 are fixed.

With the nozzle 1 connected by means of the flange 6 to a pipe (not shown) which communicates with a hydraulic installation, operation is as follows:

When the valve 18 is connected to a source of compressed air (not shown) the pressure in the chamber 12 is raised to a pressure (shown by the pressure gauge 20) which is chosen as a function of the pressure exerted by the hydraulic installation perpendicularly to the seat 3 under the closing disk 8, and the inclination of the upper disk 14 is suitably adjusted by means of fixing nuts on the tie rods 16.

When an accidental over-pressure which exceeds the adjustment value of the flexible chamber occurs in the hydraulic installation, the closing disk 8 is raised and allows a sheet of liquid to escape from around the seat 3, said sheet of liquid keeping said closing disk centered and being deflected by the skirt 23.

To modify the adjustment of the valve, it is necessary only to modify the air pressure in the chamber 12, chekcing it by means of the pressure gauge 20 and using the valve 18 with or without the assistance of a source of compressed air or other gas, according to the requirements of each case.

When these units are placed above the hood 24, it is not necessary to dismantle it since it is generally not necessary to change the adjustment of the bolts for fixing the upper plate 14 on the tie rods 16.

Once the valve is adjusted, it has an operation threshold whose value is independent of the working conditions of the hydraulic installation to be protected.

Figure 2:
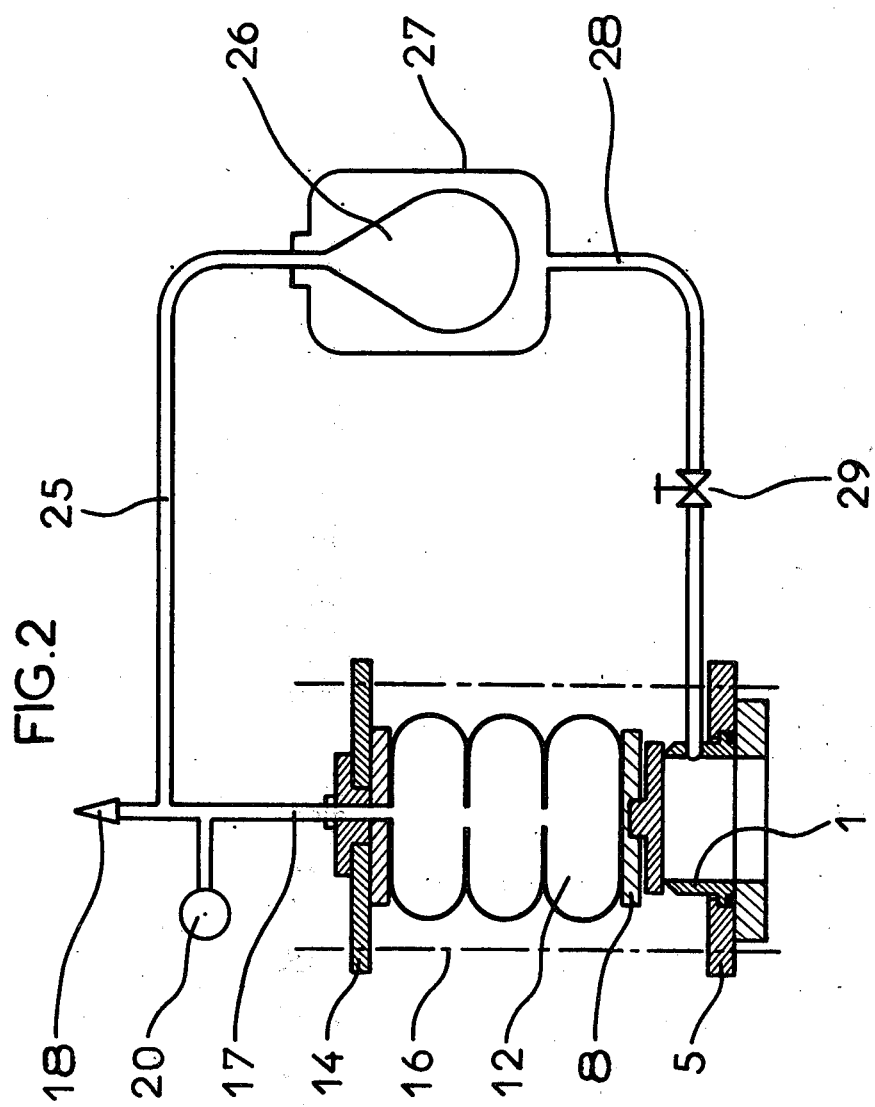
FIG. 2 schematically illustrates a cross section of a variant valve in accordance with the invention.

The variant embodiment shown in FIG. 2 has the advantage of an operation threshold which automatically follows variations in the working conditions of the installation, to the extent that these variations are not sudden.

For this purpose, a pipe 25 connects the pipe 17 to a bladder 26 which is placed within a sealed tank 27 which communicates via a pipe 28 with the pressure prevailing inside the nozzle 1 which communicates with the hydraulic installation to be protected. Further, an adjustable variable aperture diaphragm 29, is disposed through the pipe 28.

Due to variable aperture diaphragm 29, the operation threshold follows slow variations in the working pressure of the hydraulic installation but not sudden variations such as those due to ramming. The result of this is that the closing disk 8 opens only in the case of sudden overpressure.

The embodiment of FIG. 3 attempts to make the chamber 12 insensitive to pressure variations due to changes in ambient temperature and possibly also to allow adjustment at will of the setting of the operation threshold of the valve.

For this purpose, a pipe 31 connects the pipe 17 via a variable aperture diaphragm 32 to another flexible chamber 33 which is subjected to a setting weight 34. This ensures that the pressure controlling the first flexible chamber 12 remains constant in the long term and equal to the constant pressure set by the weight 34. The diaphragm 32 does not prevent rapid changes of pressure at 18 from causing the release valve to operate.

I claim:

1. An over-pressure release valve for a hydraulic installation, said valve including:
   a circular seat,
   a disk having an annular surface on one side which cooperates with the seat, said one side of the disk being subject to pressure of a liquid in a hydraulic installation;
   a thrust member positioned on the other side of the disk; and
   means for supporting the thrust member relative to the seat so as to press the disk against the seat, wherein the improvement comprises:
   said thrust member being substantially cylindrical longitudinally flexible chamber mounted coaxially with the disk and the seat, the thrust exerted by said chamber against the other side of the disk being a function only of gas pressure therein;
   the means for supporting the thrust member comprising a plurality of circumferentially spaced rods extending parallel to the axis of said chamber and spaced radially therefrom, such that the chamber is laterally unsupported and a substantially unrestricted flow area is provided around the seat between said rods; and
   the diameter of the disk being from 1.20 to 1.25 times that of the opening in the seat, and the disk being unguided and restrained only by said flexible chamber such that liquid from the hydraulic installation can flow in an unrestricted sheet when the disk lifts off the seat due to a sudden overpressure in said installation.

2. A valve according to claim 1, wherein the flexible chamber includes a valve for connection to a source of compressed gas.

3. An over-pressure release valve according to claim 1 wherein the diameter of the disk is 25 percent greater than that of the opening in the seat.

* * * * *